US009227709B1

(12) United States Patent
Schill et al.

(10) Patent No.: US 9,227,709 B1
(45) Date of Patent: Jan. 5, 2016

(54) UNDERWATER PROPELLING DEVICE FOR UNDERWATER VEHICLE

(71) Applicant: Ecole Polytechnique Federale de Lausanne, Lausanne (CH)

(72) Inventors: Felix Schill, Renens (CH); Alexander Bahr, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 14/539,493

(22) Filed: Nov. 12, 2014

(51) Int. Cl.
B63H 21/17 (2006.01)
B63G 8/08 (2006.01)
B63G 8/00 (2006.01)
B63H 5/15 (2006.01)

(52) U.S. Cl.
CPC ........ *B63G 8/08* (2013.01); *B63G 8/001* (2013.01); *B63H 5/15* (2013.01); *B63H 21/17* (2013.01); B63G 2008/002 (2013.01)

(58) Field of Classification Search
USPC .............................................. 440/6; 114/337
IPC ................. B63G 8/001,8/08; B63H 5/15, 21/17
See application file for complete search history.

(56) References Cited

U.S. PATENT DOCUMENTS 741,581 A * 10/1903 Humphrey ............. A63H 23/04
  43/26.2
5,185,545 A * 2/1993 Veronesi .................. B63H 1/16
  310/114

(Continued)

FOREIGN PATENT DOCUMENTS

WO    WO 2014113121 A2 * 7/2014 ............ B63G 8/001

*Primary Examiner* — Stephen Avila
(74) *Attorney, Agent, or Firm* — Taft Stettinius & Hollister LLP

(57) ABSTRACT

The present invention relates to an underwater propelling device (10) i
  a stator (20) comprising circumferential arrayed coils (35) and being adapted to generate a controlled electromagnetic field along an axial direction,
  a shaftless propellant rotor (30) comprising:
    at least two magnetized ring-shaped plates, respectively an upper magnetized plate (31) and a lower magnetized plate (32), coaxially spaced-apart along said axial direction and perpendicular thereto such that said circumferential arrayed coils (35) are positioned therebetween, each plate (31, 32) defining a central aperture (31*a*, 32*a*) and having a circumferential array of radially extended magnetized poles (34) embedded therein, said magnetized poles (34) generating a magnetic field which interacts with the electromagnetic field of the stator (20) so as to cause the rotation of said plates (31, 32) about a central axis (ZZ') parallel to said axial direction,
    at least one ring-shaped propeller (33) defined by its outer periphery and its inner periphery, said propeller being received inside the central apertures (31*a*, 32*a*) of said plates (31, 32) and fixedly secured thereto,
    a plurality of propeller blades (35) projecting inward from the inner periphery of said propeller (33), said blades (35) producing a thrust along the central axis (ZZ') when the plates (31, 32) rotate,
  wherein the rotor (30) is axially separated from the stator (20) by a gap, preferably less than 3 mm, so as to permit the formation of a hydraulic film inside said gap, said hydraulic film being adapted to provide lubrication of the rotor, thus reducing friction between the rotor and the stator, and to transmit the axial thrust force of the rotor to the stator.

19 Claims, 8 Drawing Sheets

(56) References Cited

U.S. PATENT DOCUMENTS

| | | | | |
|---|---|---|---|---|
| 5,306,183 | A * | 4/1994 | Holt | B63H 5/14 310/114 |
| 8,708,668 | B2 * | 4/2014 | Tanaka | B63H 1/16 417/356 |
| 2001/0029133 | A1 * | 10/2001 | Breems | B63H 5/1252 440/6 |
| 2003/0194922 | A1 * | 10/2003 | Van Dine | B63H 23/24 440/6 |
| 2009/0186535 | A1 * | 7/2009 | Sullivan | B60F 3/0007 440/6 |
| 2010/0279559 | A1 * | 11/2010 | Yoshikawa | B63H 5/14 440/6 |
| 2012/0094555 | A1 * | 4/2012 | Calverley | B63H 23/24 440/6 |
| 2013/0115832 | A1 * | 5/2013 | Suzuki | B63H 21/14 440/1 |

* cited by examiner

UNDERWATER PROPELLING DEVICE FOR UNDERWATER VEHICLE

FIELD OF THE INVENTION

The present invention relates to an underwater propelling device for an underwater vehicle. More particularly, it concerns a propelling device with a light and simple structure that can be easily manufactured.

The present invention relates also to an underwater vehicle equipped with such an underwater propelling device.

BACKGROUND OF THE INVENTION

Unmanned underwater vehicles are known for a long time. In particular, a toy submarine boat has been disclosed in the document U.S. Pat. No. 741,581. More recently, such vehicles have been used as drones for carrying out a variety of tasks in the underwater environment, e.g. pipeline surveys and investigations or military tasks. An example of such an application has been disclosed in the document WO 2014/113121.

Unmanned underwater vehicles often have small or miniature dimensions so as to permit their easy handling and their storage inside limited space. However, such miniature dimensions can increase the vulnerability of the underwater vehicles to debris intrusion or to fishing lines becoming tangled in the propeller of said vehicles, which could significantly reduce their performance and, in the worst case, lead to their deterioration and loss of the vehicle. Additionally, it can be challenging to ensure that the moving parts of a propulsion system are water- and pressure proof with high reliability. Dynamic seals around motor shafts can wear out quickly, particularly when exposed to suspended sand particles or other particulates in the water. Exposed metal parts are also affected by corrosion when exposed to water, especially in salt water. A failed seal generally results in rapid water ingress which will damage internal components, and decrease vehicle buoyancy, which may lead to a complete loss of the entire vehicle.

Different solutions to these problems have been proposed in the past.

One solution to render the electric motor of the propelling device of said vehicles water- and pressure-proof is to use O-rings and dynamic seals which may wear quickly. Filling the motor with oil to resist external pressure decreases stress on the seal and mitigates the risk of water ingress, but it increases friction within the narrow magnetic gap of the motor, may release oil into the environment and requires regular maintenance to replace lost oil. Alternatively, a magnetic coupler between the motor and the propeller can be used which adds bulk and complexity and limits torque.

A first aim of the present invention is therefore to provide an underwater propelling device for miniature underwater vehicles, wherein the above mentioned drawbacks are avoided.

A second aim of the present invention is to provide an underwater propelling device having a compact and low profile structure so as to reduce drag caused by the bulk of the motor, thus improving the underwater vehicle's performance, particularly when the propelling device is used as an attitude control thruster and mounted perpendicularly to the main direction of travel of the underwater vehicle.

A third aim of the present invention is to provide an underwater propelling device that can be easily manufactured.

SUMMARY OF THE INVENTION

In this view, the present invention relates to an underwater propelling device comprising:
  a stator comprising circumferential arrayed coils and being adapted to generate a controlled electromagnetic field along an axial direction,
  a shaftless propellant rotor comprising:
    at least two magnetized ring-shaped plates coaxially spaced-apart along said axial direction and perpendicular thereto such that said circumferential arrayed coils are positioned therebetween, each plate defining a central aperture and having a circumferential array of radially extended magnetized poles embedded therein, said magnetized poles generating a magnetic field which interacts with the electromagnetic field of the stator so as to cause the rotation of said plates about a central axis parallel to said axial direction,
    at least one ring-shaped propeller defined by its outer periphery and its inner periphery, said propeller being received inside the central apertures of said plates and fixedly secured thereto,
    a plurality of propeller blades projecting inward from the inner periphery of said propeller, said blades producing a thrust along the central axis when the plates rotate,
  wherein the rotor is axially separated from the stator by a gap so as to permit the formation of a hydraulic film inside said gap, said hydraulic film being adapted to provide lubrication of the rotor, thus reducing friction between the rotor and the stator, and to transmit the axial thrust force of the rotor to the stator.

Important features of the propelling device are defined in dependent claims 2 to 11.

The present invention relates also to an underwater vehicle equipped with such an underwater propelling device as defined in dependent claims 12 to 18.

Due to its axial flux magnet arrangement instead of the more common radial flux magnet arrangement, the underwater propelling device of the present invention has the advantage that a high magnetic flux density can be achieved between the pair of magnetic plates of the rotor without needing an iron core. This allows for a wider gap between the stator and the rotor than in conventional radial-flux electric motors, thus reducing hydrodynamic friction between rotor and stator, and making the arrangement less prone to abrasion from debris.

Additionally, it simplifies the mounting requirements for the rotor. In conventional permanent magnet motors, any imbalance causes large magnetic forces between the permanent magnets in the rotor and the stator that increase the imbalance. To withstand said forces, the rotor in other motor designs is generally mounted on a central shaft with bearings. However, this solution increases the risk that a debris such as fishing lines or water plants winds around the shaft, stalling the rotor. On the contrary, in the invention, due to the lack of an iron core in the stator, said magnetic forces do not occur other than the magnetic forces producing torque, eliminating the need for rigid bearings. In the invention, the shaftless rotor glides on a water film, said film forming a hydrodynamic bearing that transmits thrust to the stator while using the surrounding water as lubrication. Furthermore, small debris, like sand particulates, that may be trapped inside the gap separating the rotor and the stator are easily washed out by this water film. The risk that particulates get stuck between rotor and stator, potentially causing damage to the motor, is greatly reduced, as the rotor is not rigidly mounted and can temporarily move axially or radially until the particulates are dislodged and flushed away.

Finally, the propelling device of the present invention can be produced with minimal assembling overhead due to the limited number of its constituting parts.

BRIEF DESCRIPTION OF THE DRAWINGS

Other features and advantages of the present invention will appear more clearly from the detailed description of one embodiment of the invention which is presented solely by way of a non-restricted example and illustrated by the attached drawings in which.

DETAILED DESCRIPTION OF EMBODIMENTS OF THE INVENTION

Figure 1:
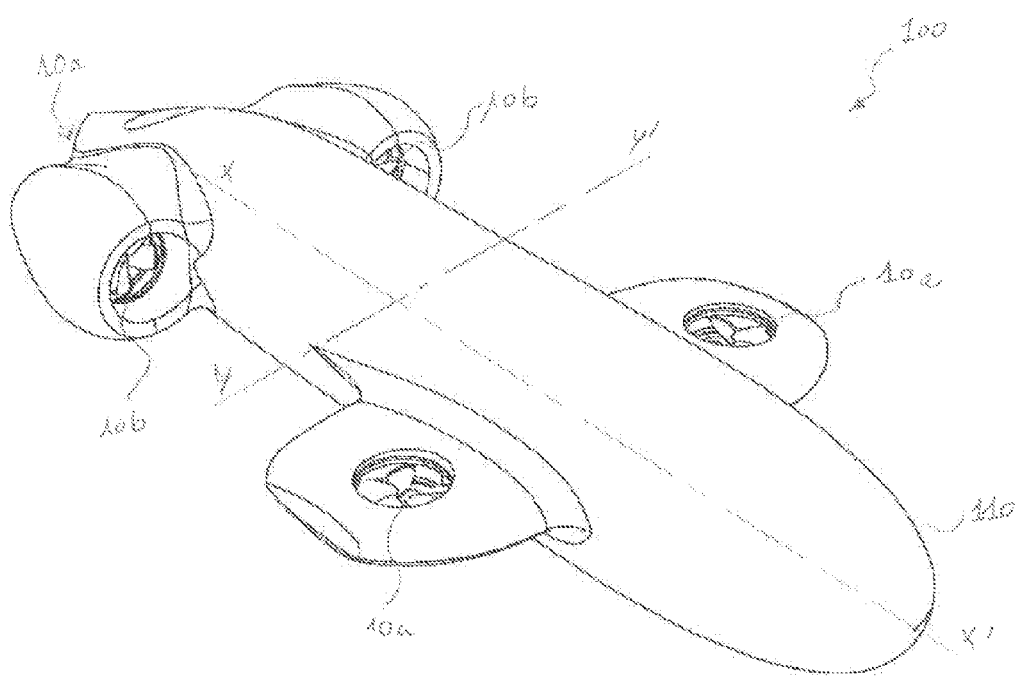
FIG. 1 is a perspective view of a submarine vessel equipped with several propelling devices of the present invention.

In reference to FIG. 1, there is shown a submarine vessel 100 having a body 110 that mounts five propelling devices 10a, 10b according to the present invention. Each propelling device is configured to provide a controlled thrust in either of two opposing directions, whereby the propelling devices can be controlled to cooperate to move the vessel in any desired direction. In particular, three propelling devices 10a are configured to provide a thrust along a direction perpendicular to a longitudinal axis XX' of the body 110 and two propelling devices 10b are configured to provide a thrust along a direction parallel to said longitudinal axis XX'. The body 110 may advantageously have small dimensions. In particular, its length along the longitudinal axis XX' may preferably be less than 1.5 meter and, more preferably, less than 80 cm.

Figure 8:
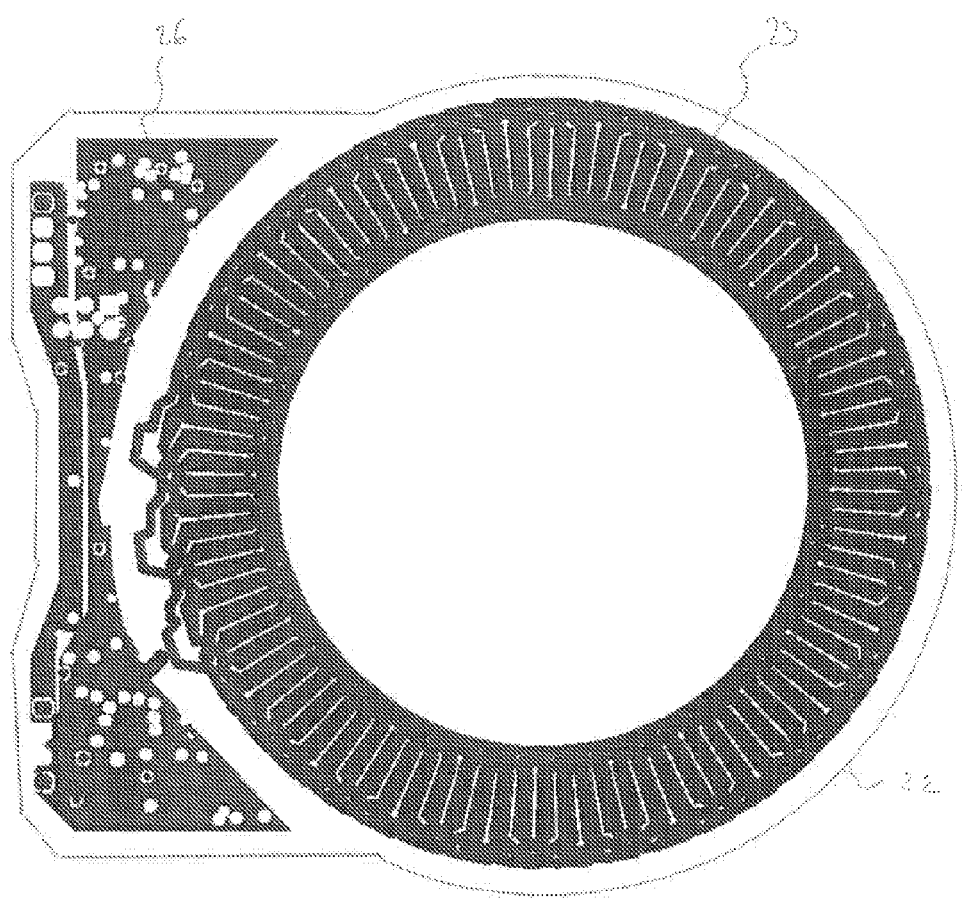
FIG. 8 is a circuit board layout view of the stator plate of the propelling device illustrated in FIG. 4.

As shown in FIGS. 2 to 5, each propelling device 10 includes a stator assembly 20 securely fastened to the body 110 and a shaftless rotor assembly 30 located within a housing 25 defined by the stator assembly. The rotor assembly is configured to rotate in either of two opposing directions about a central axis ZZ'. More particularly, the stator assembly 20 includes an external water-proof casing 21, preferably made in a plastic material, which encapsulates a stator plate 22. As shown in detail in FIGS. 6 and 8, said stator plate 22 is constructed of a multilayer printed circuit board (PCB), each PCB layer comprising circumferential arrayed coils 23 formed of a conductive material and supported by a nonconductive dielectric material. The coils are interconnected to create a circuitry adapted for single or multi-phase supply.

The stator plate 22 can be made by any of the well known PCB manufacturing methods and can be in accordance, for example, with the PCB stator of the U.S. Pat. No. 6,411,002. Advantageously, the stator plate 22 includes also a control section 24 formed by integrated circuit chips that are connected to conductive patterns 26 formed in the layers of the stator plate by any suitable material. Such a control section 24 is adapted to control the current in the coils 23 so as to generate a multipole electromagnetic field rotating around the axis ZZ'.

Figure 2:
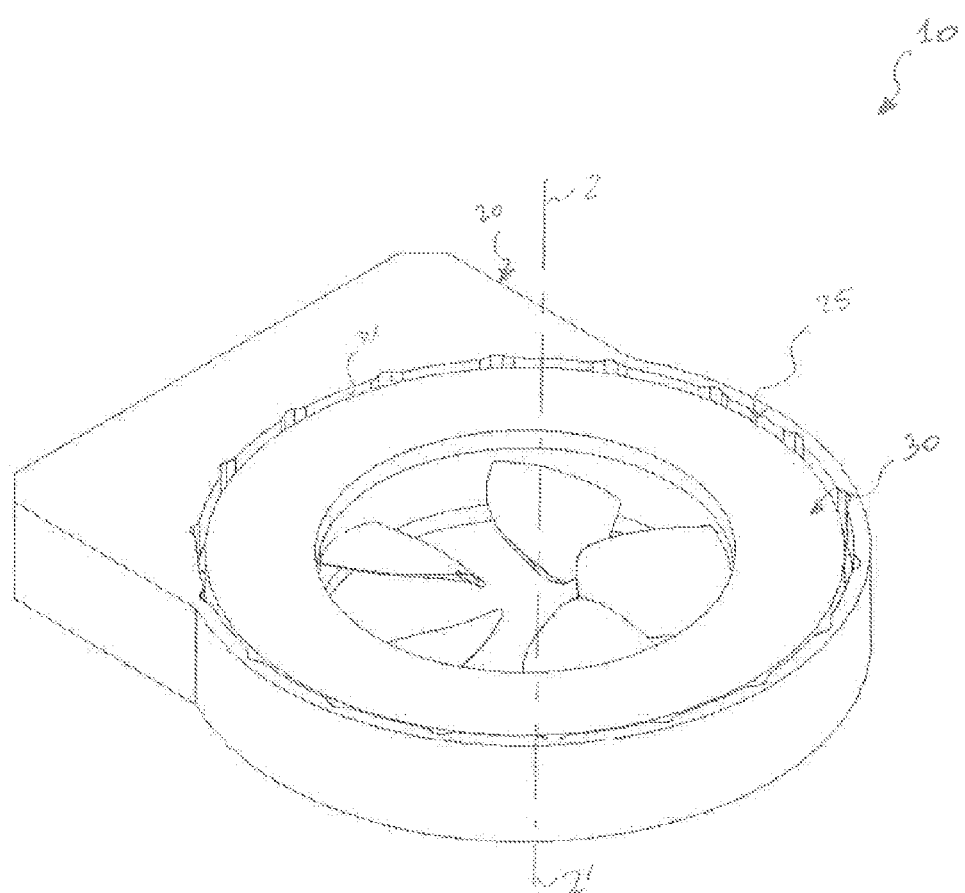
FIG. 2 is a perspective view of a propelling device according to an embodiment of the present invention.
Figure 3:
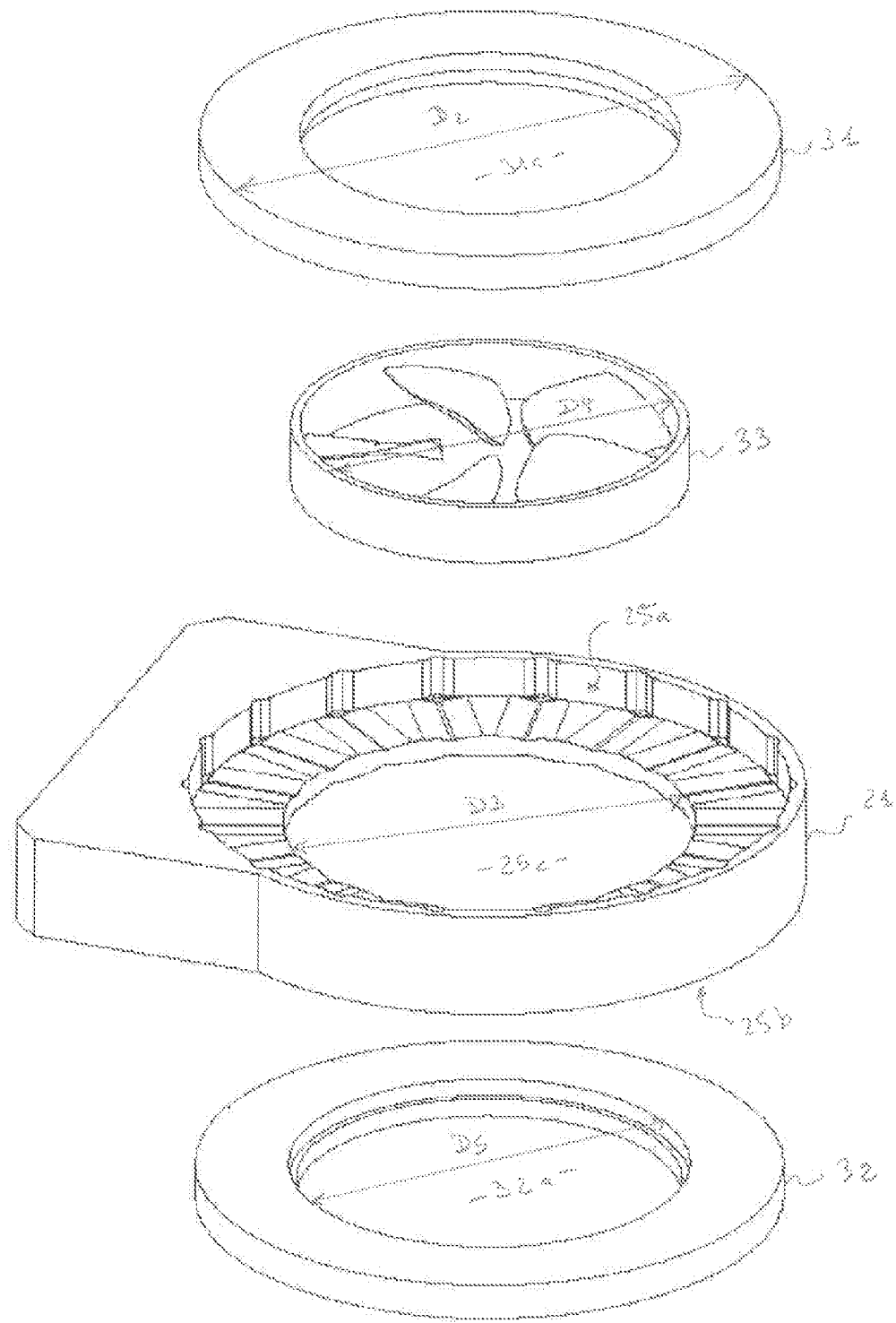
FIG. 3 is an exploded perspective view of the propelling device of FIG. 2.
Figure 4:
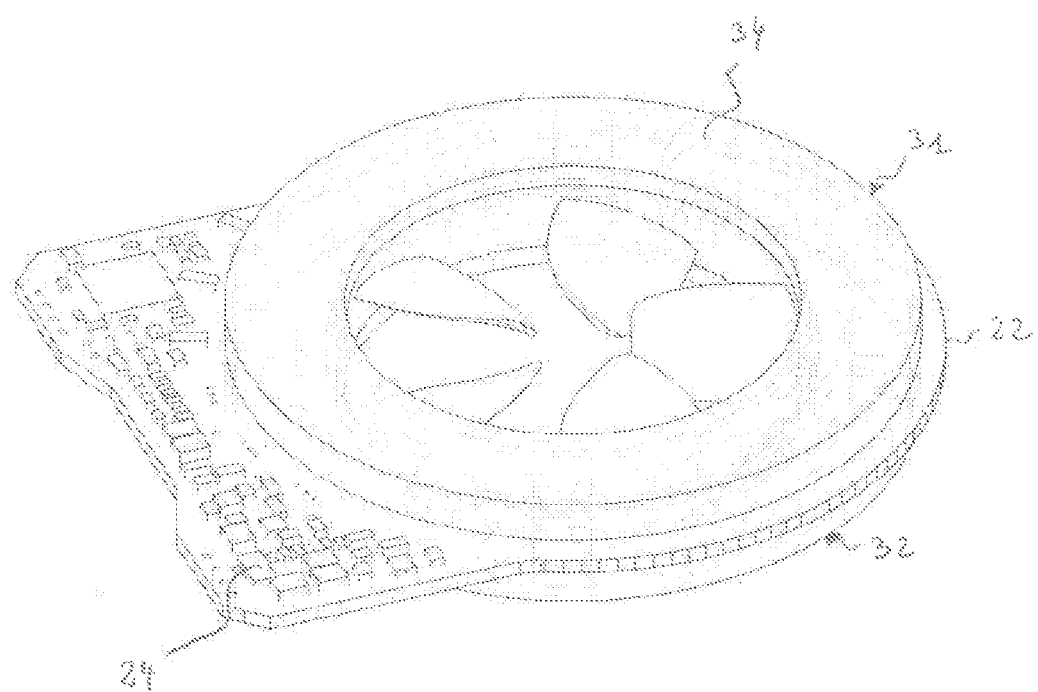
FIG. 4 is a perspective view of the propelling device of FIG. 2 without its stator's casing.
Figure 7:
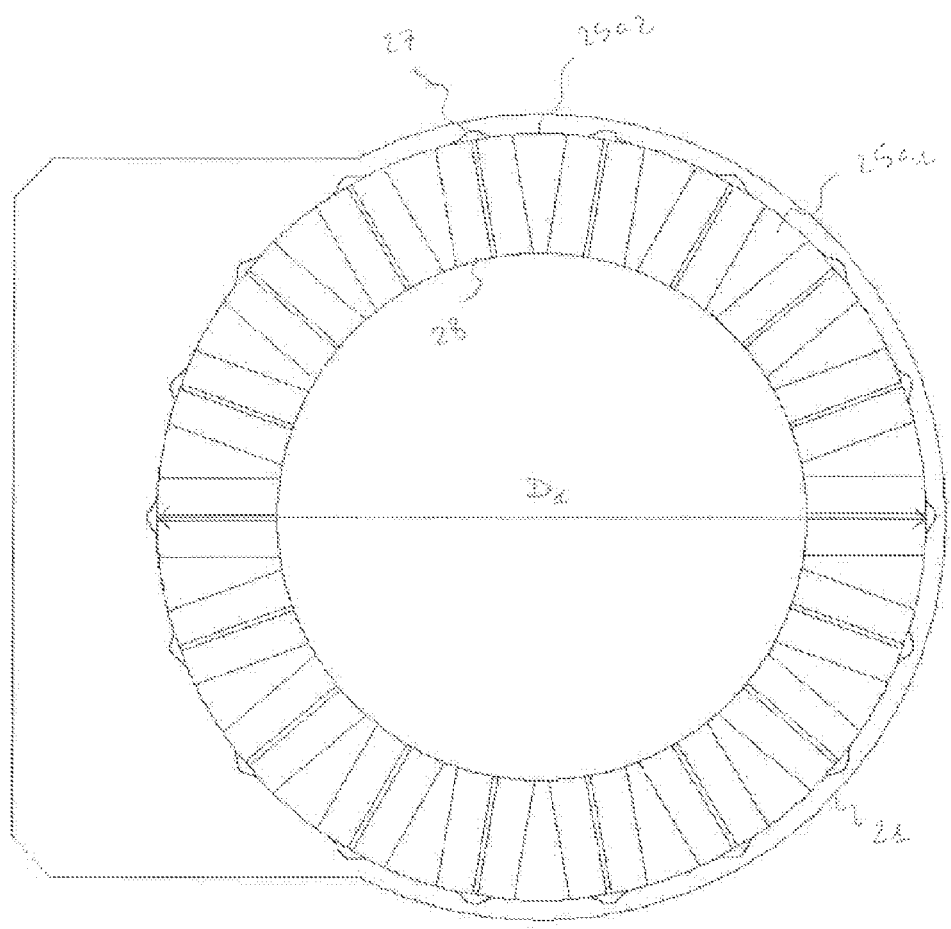
FIG. 7 is a top view of the stator's casing of the propelling device of FIG. 2 showing the grooves which enhance the hydraulic film between rotor and stator.

As shown in FIGS. 3 and 7, the external casing 21 has substantially the same shape as the stator plate 22, when seen in the axial direction. The casing 21 may advantageously be slightly thicker than the stator plate 22 so as to define a housing cavity 25 for an upper ring-shaped plate 31 containing a set of magnets, a lower ring-shaped plate 32 containing a set of magnets and a ring-shaped propeller 33, said plates 31, 32 and said propeller 33 forming the rotor assembly 30. Accordingly, said housing cavity 25 comprises an upper disk-shaped sub-housing 25a and a lower disk-shaped sub-housing 25b, said sub-housing 25a, 25b having substantially a symmetrical shape relative to the median plane P defined by the stator plate 22 and being axially separated by a central disk-shaped sub-housing 25c substantially aligned with said median plane P. As illustrated in FIG. 2, the diameter D1 of said upper and lower sub-housings 25a, 25b is advantageously slightly bigger than the diameter D2 of said upper and lower magnetized ring-shaped plates 31, 32 so as to define an annular gap between them, inside which a liquid W can circulate, thus permitting the easy rotation of the rotor assembly 30 around the axis ZZ'. The liquid W may advantageously be the surrounding liquid in which the propelling device operates, for example, but not limited to, water. For the same reasons, the diameter D3 of the central sub-housing 25c may preferably be slightly bigger than the diameter D4 of the propeller 33. Furthermore, during use, the upper plate 31, respectively the lower plate 32, may advantageously be positioned along the axis ZZ' so as to be axially separated from the bottom face $25a_1$ of the upper sub-housing 25a, respectively the top face of the lower sub-housing 25b, by a gap, inside which the liquid W can circulate, thus creating a hydraulic film between the rotor 30 and the stator 20 that reduces friction between rotor 30 and stator 20 and permits the transmission of the thrust produced by the propeller 33 to said stator. This gap may preferably be less than 3 mm. As shown in detail in FIG. 7, the bottom and lateral faces $25a_1$, $25a_2$ of the upper sub-housing 25a, respectively the top and lateral faces of the lower sub-housing 25b, may advantageously be provided with a series of grooves 27, 28 circumferentially spaced-apart, said grooves being adapted to improve the formation of a hydraulic film by the liquid W between the rotor 30 and the stator 20 by creating a wedge-shaped volume between rotor 30 and stator 20 around said grooves. The liquid W is forced into said wedge-shaped volume by the rotation of the rotor 30, which creates an axial force repelling the rotor from the stator, thus preventing direct contact between stator 20 and rotor 30 and permitting the transmission of axial thrust forces from the propeller 33.

Figure 5:
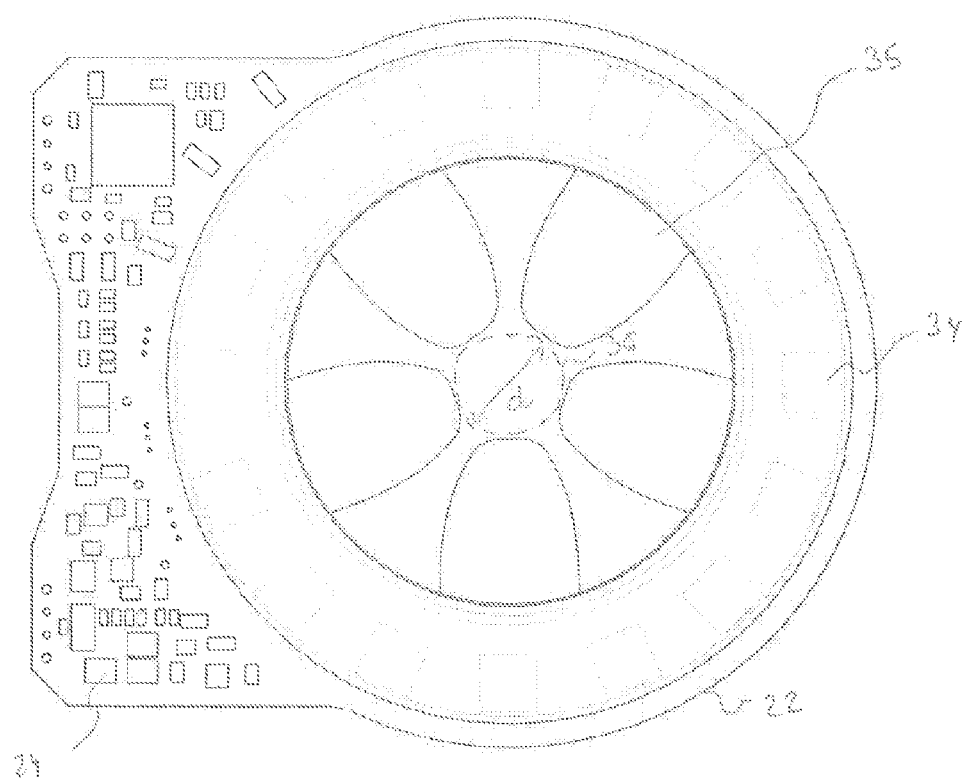
FIG. 5 is a top view of the propelling device illustrated in FIG. 4.
Figure 6:
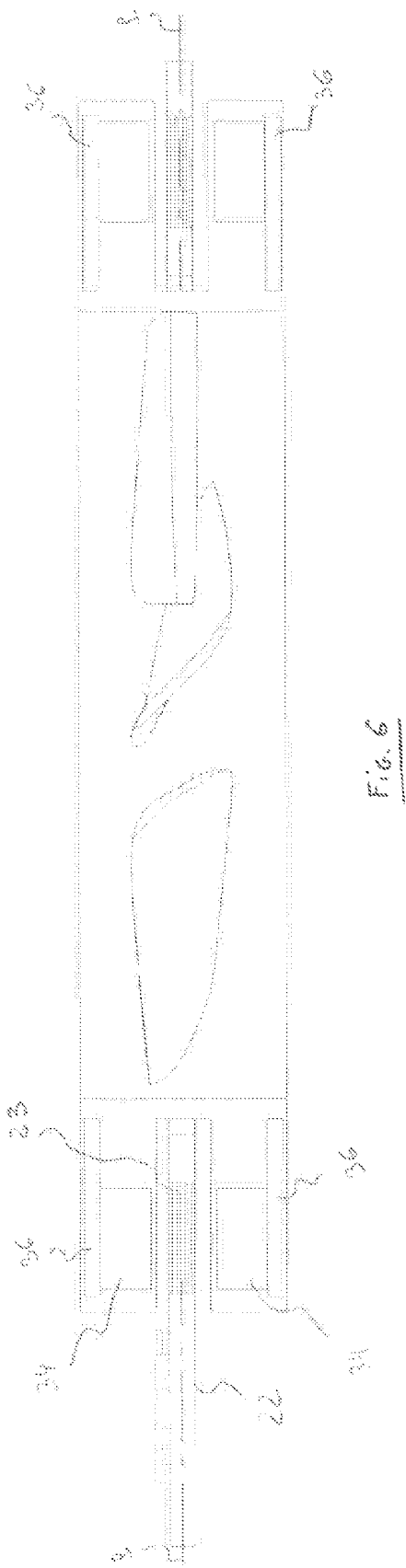
FIG. 6 is a lateral sectional view of the propelling device illustrated in FIG. 4.

As shown in FIG. 3, each magnetized plate 31, 32 of the rotor 30 defines a central disc-shaped aperture 31a, 32a adapted to receive the propeller 33. In particular, the diameter D5 of said apertures may advantageously be substantially equal to or slightly lower than the diameter D4 of said propeller so as to permit the fixed connection of said propeller to said plates by clamping. Advantageously, the fixed connection of the propeller by clamping is achieved by the naturally occurring magnetic attraction forces between the two magnetized plates. Therefore, one can easily mount or dismount the propeller to the magnetized plates without the help of a tool and without the need of additional connecting means. As shown in FIGS. 5 and 6, each magnetized plate 31, 32 has a circumferential array of radially extended magnetized poles 34 embedded therein, said magnetized poles generating an axial magnetic field that is perpendicular to the radially oriented current flow of the coils 23 of the stator 20. Advantageously, the magnetized plates 31, 32 also contain an annular ring 36, advantageously made from a ferrous material such as iron, mounted to the set of magnets 34 on the side facing away from the stator 20, to contain the rear magnetic field of the magnets so as to increase the magnetic flux across the stator 20 and to reduce the magnetic field outside the motor assembly to reduce interference with other equipment on the underwater vehicle. Thus, when the upper and lower magnetized plates 31, 32 are positioned in their respective sub-housings 25a, 25b, the stator plate 22 is positioned between said plates 31, 32 such that the coils 23 are positioned straight below, respectively straight above, said upper magnetized plate 31, respectively said lower magnetized plate 32, thus causing the rotation of said magnetized plates around the axis ZZ' under the action of electromagnetic forces.

As shown in FIG. 5, the propeller 33 comprises a plurality of propeller blades 35 projecting inwardly from the inner periphery of said propeller, said blades producing a thrust along the axis ZZ' when the rotor 30 rotates. Said blades 35 may be configured so as to define a cylindrical free area 36 having a diameter d, said area 36 providing a crossing path to debris such as water plants or fishing lines, thus preventing that said debris be wound around said propeller blades.

The above detailed description with reference to the drawings illustrates rather than limits the invention. There are numerous alternatives, which fall within the scope of the appended claims.

The invention claimed is:

1. An underwater propelling device comprising:
   a stator comprising circumferential arrayed coils and being adapted to generate a controlled electromagnetic field along an axial direction,
   a shaftless propellant rotor comprising:
      at least two magnetized ring-shaped plates, respectively an upper magnetized plate and a lower magnetized plate, coaxially spaced-apart along said axial direction and perpendicular thereto such that said circumferential arrayed coils are positioned therebetween, each plate defining a central aperture and having a circumferential array of radially extended magnetized poles embedded therein, said magnetized poles generating a magnetic field which interacts with the electromagnetic field of the stator so as to cause the rotation of said plates about a central axis parallel to said axial direction,
      at least one ring-shaped propeller defined by its outer periphery and its inner periphery, said propeller being received inside the central apertures of said plates and fixedly secured thereto,
      a plurality of propeller blades projecting inward from the inner periphery of said propeller, said blades producing a thrust along the central axis when the plates rotate,
   wherein the rotor is axially separated from the stator by a gap so as to permit the formation of a hydraulic film inside said gap, said hydraulic film being adapted to provide lubrication of the rotor, thus reducing friction between the rotor and the stator, and to transmit the axial thrust force of the rotor to the stator.

2. The propelling device according to claim 1, wherein the outer periphery of the ring-shaped propeller has a diameter substantially equal to or slightly bigger than the diameter of the central aperture of each plate so as to permit the positioning of said propeller inside said central aperture and the fixed connection of said propeller to the at least two magnetized disk-shaped plates by clamping.

3. The propelling device according to claim 1, wherein the stator comprises a stator plate comprising at least one printed circuit board provided with one or several layers, inside which the coils are realized as conductive patterns.

4. The propelling device according to claim 3, wherein the stator plate comprises a control section adapted to control the current received by the coils.

5. The propelling device according to claim 4, wherein the control section is formed by integrated circuit chips connected to conductive patterns of the stator plate.

6. The propelling device according to claim 3, wherein the stator plate is encapsulated in a water-proof casing.

7. The propelling device according to claim 6, wherein the casing defines a housing for the rotor.

8. The propelling device according to claim 7, wherein the housing comprises an upper disc-shaped sub-housing adapted to receive the upper magnetized plate and a lower disc-shaped sub-housing adapted to receive the lower magnetized plate, said sub-housings being axially separated by a central disc-shaped sub-housing adapted to at least partially receive the propeller.

9. The propelling device according to claim 8, wherein the upper sub-housing, respectively the lower sub-housing, has a diameter slightly higher than the diameter of the upper magnetized plate, respectively of the lower magnetized plate, thus defining an annular gap between said upper, respectively said lower, sub-housing and said upper, respectively said lower, magnetized plate inside which a liquid can circulate.

10. The propelling device according to claim 9, wherein the upper sub-housing, respectively the lower sub-housing, is defined by a bottom face and a lateral face, respectively by a top face and a lateral face, said bottom and lateral faces, respectively said top and lateral faces, being provided with a series of circumferentially spaced-apart grooves adapted to improve the formation of a hydraulic film between the stator and the rotor.

11. The propelling device according to claim 1, wherein the propeller blades are configured so as to define a cylindrical free area forming a crossing path to debris, such as but not limited to a fishing line or water plants.

12. An underwater vehicle comprising at least one propeller device according to claim 1.

13. The underwater vehicle according to claim 12, comprising a body having a length less than 1.5 meter.

14. The underwater vehicle according to claim 13, wherein the length of the body is less than 80 cm.

15. The underwater vehicle according to claim 12, comprising sets of two or more propelling devices adapted to control their rotation speeds independently such as to provide a directional thrust parallel to an axis of said vehicle, as well as a rotational torque around another axis of said underwater vehicle.

16. The underwater vehicle according to claim 12, wherein the outer hull or parts of the hull of said vehicle is shaped around said propelling device such that hydrodynamic drag is reduced when the underwater vehicle is moving.

17. The underwater vehicle according to claim 12, comprising three propelling devices adapted to provide a thrust along a direction perpendicular to a longitudinal axis of the body as well as a torque around said longitudinal axis and a torque around a lateral axis perpendicular to said longitudinal axis, and two propelling devices adapted to provide a thrust along a direction parallel to said longitudinal axis as well as a torque around an axis perpendicular to said longitudinal axis and said lateral axis.

18. A submarine vessel according to claim 12.

19. The underwater vehicle according to claim 1, wherein the rotor is axially separated from the stator by a gap of less than 3 mm.

* * * * *